(12) United States Patent
Fujiwara

(10) Patent No.: US 12,351,709 B2
(45) Date of Patent: Jul. 8, 2025

(54) VINYL CHLORIDE RESIN COMPOSITION, VINYL CHLORIDE RESIN MOLDED PRODUCT, AND LAMINATE

(71) Applicant: ZEON CORPORATION, Tokyo (JP)

(72) Inventor: Takanori Fujiwara, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 927 days.

(21) Appl. No.: 17/593,252

(22) PCT Filed: Mar. 23, 2020

(86) PCT No.: PCT/JP2020/012693
§ 371 (c)(1),
(2) Date: Sep. 14, 2021

(87) PCT Pub. No.: WO2020/196396
PCT Pub. Date: Oct. 1, 2020

(65) Prior Publication Data
US 2022/0153982 A1  May 19, 2022

(30) Foreign Application Priority Data

Mar. 26, 2019 (JP) ................. 2019-058693
Nov. 12, 2019 (JP) ................. 2019-204963

(51) Int. Cl.
| | |
|---|---|
| *C08L 27/06* | (2006.01) |
| *B29C 41/18* | (2006.01) |
| *B29K 27/06* | (2006.01) |
| *B29L 31/30* | (2006.01) |
| *B32B 5/18* | (2006.01) |
| *B32B 27/06* | (2006.01) |
| *B32B 27/30* | (2006.01) |
| *C08J 9/00* | (2006.01) |

(52) U.S. Cl.
CPC ............ *C08L 27/06* (2013.01); *B32B 27/065* (2013.01); *B32B 27/304* (2013.01); *C08J 9/00* (2013.01); *B29C 41/18* (2013.01); *B29K 2027/06* (2013.01); *B29L 2031/3008* (2013.01); *B32B 5/18* (2013.01); *B32B 2250/02* (2013.01); *B32B 2250/24* (2013.01); *B32B 2266/0278* (2013.01); *B32B 2605/003* (2013.01); *C08J 2375/08* (2013.01)

(58) Field of Classification Search
CPC ..................................................... C08L 27/06
See application file for complete search history.

(56) References Cited

U.S. PATENT DOCUMENTS

| | | | |
|---|---|---|---|
| 2016/0288463 A1 | 10/2016 | Fujiwara | |
| 2017/0009055 A1 * | 1/2017 | Fujiwara | ............. C08J 5/18 |

FOREIGN PATENT DOCUMENTS

| | | | | |
|---|---|---|---|---|
| EP | 2774963 A1 | 9/2014 | | |
| EP | 3875240 A1 | 9/2021 | | |
| GB | 715217 A | * 9/1954 | ............. C08L 27/06 |
| JP | H07268159 A | 10/1995 | | |
| JP | H07268207 A | 10/1995 | | |
| JP | H08291243 A | 11/1996 | | |
| JP | H08337700 A | 12/1996 | | |
| JP | 2012197394 A | 10/2012 | | |
| JP | 2014172993 A | 9/2014 | | |
| JP | 2018035304 A | 3/2018 | | |
| WO | 2015087522 A1 | 6/2015 | | |
| WO | 2016098344 A1 | 6/2016 | | |

OTHER PUBLICATIONS

Translation of JP 08-337700 (1996, 5 pages).*
Dec. 14, 2021, Submissions for publications issued by the Japan Patent Office in the corresponding Japanese Patent Application No. 2021-509389.
Polymer Industry Research Institute, Vinyl chloride catalog collection, 1986, Miyamoto Fumio, with a partial English translation.
Taoka Chemical Company, Limited, Chemicals Group Product Information, Nov. 2016, with a partial English translation.
Sep. 28, 2021, International Preliminary Report on Patentability issued in the International Patent Application No. PCT/JP2020/012693.
Jun. 16, 2020, International Search Report issued in the International Patent Application No. PCT/JP2020/012693.
Nov. 21, 2022, the Extended European Search Report issued by the European Patent Office in the corresponding European Patent Application No. 20776641.1.

* cited by examiner

*Primary Examiner* — Brieann R Johnston
(74) *Attorney, Agent, or Firm* — KENJA IP LAW PC

(57) ABSTRACT

A vinyl chloride resin composition contains (a) a vinyl chloride resin and (x) a plasticizer. The (x) plasticizer includes (b) a trimellitic acid ester and (c) a polyester including a structural unit derived from adipic acid and a structural unit derived from 3-methyl-1,5-pentanediol. The total content of the (b) trimellitic acid ester and the (c) polyester is 65 parts by mass or more per 100 parts by mass of the (a) vinyl chloride resin, and the proportion constituted by the content of the (c) polyester in the total content of the (b) trimellitic acid ester and the (c) polyester is more than 50 mass %.

13 Claims, No Drawings

VINYL CHLORIDE RESIN COMPOSITION, VINYL CHLORIDE RESIN MOLDED PRODUCT, AND LAMINATE

TECHNICAL FIELD

The present disclosure relates to a vinyl chloride resin composition, a vinyl chloride resin molded product, and a laminate.

BACKGROUND

Vinyl chloride resins are used in a variety of applications due to generally having excellent characteristics in terms of cold resistance, heat resistance, oil resistance, and so forth.

Specifically, automobile interior materials such as a surface skin formed of a vinyl chloride resin molded product and a laminate obtained by lining a surface skin formed of a vinyl chloride resin molded product with a foamed product such as foamed polyurethane are used in the formation of automobile interior components such as automobile instrument panels and door trims.

A vinyl chloride resin molded product that constitutes a surface skin of an automobile interior component such as an automobile instrument panel is produced, for example, by performing molding by a known molding method such as powder slush molding with respect to a vinyl chloride resin composition that contains a vinyl chloride resin, a plasticizer, and additives such as a pigment (for example, refer to Patent Literature (PTL) 1).

In one specific example described in PTL 1, a surface skin formed of a vinyl chloride resin molded product is produced through powder molding of a vinyl chloride resin composition that contains vinyl chloride resin particles, a trimellitic acid ester plasticizer, and additives such as a pigment formed of a mixture of phthalocyanine blue, titanium oxide, and carbon.

CITATION LIST

Patent Literature

PTL 1: JP-H8-291243A

SUMMARY

Technical Problem

It is desirable for a vinyl chloride resin molded product used as a surface skin of an automobile interior component or the like to have excellent flexibility when evaluated at low temperature (hereinafter, also referred to as "low-temperature flexibility"). The low-temperature flexibility of a vinyl chloride resin molded product decreases through heat aging or the like when the vinyl chloride resin molded product is heated. Therefore, it is also desirable that a vinyl chloride resin molded product has little reduction of low-temperature flexibility due to heating (i.e., maintains low-temperature flexibility well between before and after heating).

However, there is room for improvement of a vinyl chloride resin molded product obtained through molding of the vinyl chloride resin composition according to the conventional technique described above in terms of maintaining low-temperature flexibility well between before and after heating.

In addition, it is desirable for a vinyl chloride resin composition to inhibit staining of a mold after removal of a vinyl chloride resin molded product obtained through molding of the vinyl chloride resin composition (i.e., to have excellent mold staining resistance).

However, there is room for improvement of mold staining resistance of the vinyl chloride resin composition according to the conventional technique described above.

Accordingly, one object of the present disclosure is to provide a vinyl chloride resin composition that has excellent mold staining resistance and that can form a vinyl chloride resin molded product that can maintain low-temperature flexibility well between before and after heating.

Another object of the present disclosure is to provide a vinyl chloride resin molded product that can maintain low-temperature flexibility well between before and after heating.

Yet another object of the present disclosure is to provide a laminate including the aforementioned vinyl chloride resin molded product.

Solution to Problem

The inventor conducted diligent investigation with the aim of solving the problems set forth above. The inventor discovered that in the case of a vinyl chloride resin composition that is obtained by using a trimellitic acid ester and a polyester including specific structural units as plasticizers, by setting the total content of the trimellitic acid ester and the polyester as not less than a specific value, and by setting the proportion constituted by the content of the polyester in the aforementioned total content as more than a specific value, the vinyl chloride resin composition has excellent mold staining resistance and can form a vinyl chloride resin molded product that can maintain low-temperature flexibility well between before and after heating. In this manner, the inventor completed the present disclosure.

Specifically, the present disclosure aims to advantageously solve the problems set forth above, and a presently disclosed vinyl chloride resin composition comprises: (a) a vinyl chloride resin; and (x) a plasticizer, wherein the (x) plasticizer includes: (b) a trimellitic acid ester; and (c) a polyester including a structural unit derived from adipic acid and a structural unit derived from 3-methyl-1,5-pentanediol, total content of the (b) trimellitic acid ester and the (c) polyester is 65 parts by mass or more per 100 parts by mass of the (a) vinyl chloride resin, and a proportion constituted by content of the (c) polyester in the total content of the (b) trimellitic acid ester and the (c) polyester is more than 50 mass %. When a vinyl chloride resin composition contains a vinyl chloride resin and also contains a trimellitic acid ester and a polyester including specific structural units as plasticizers, has a total content of the trimellitic acid ester and the polyester that is not less than a specific value, and has a content of the polyester as a proportion of the aforementioned total content that is more than a specific value in this manner, the vinyl chloride resin composition can display excellent mold staining resistance and can form a vinyl chloride resin molded product that can maintain low-temperature flexibility well between before and after heating.

In the presently disclosed vinyl chloride resin composition, the total content of the (b) trimellitic acid ester and the (c) polyester is preferably 90 parts by mass or more per 100 parts by mass of the (a) vinyl chloride resin. When the total content of the (b) trimellitic acid ester and the (c) polyester is not less than the specific value set forth above in this manner, meltability of the vinyl chloride resin composition can be increased.

In the presently disclosed vinyl chloride resin composition, the (a) vinyl chloride resin preferably includes vinyl chloride resin particles having a volume-average particle diameter of not less than 30 μm and not more than 500 μm and vinyl chloride resin fine particles having a volume-average particle diameter of less than 30 μm. When the (a) vinyl chloride resin includes vinyl chloride resin particles having a volume-average particle diameter within a specific range and vinyl chloride resin fine particles having a volume-average particle diameter of less than a specific value in this manner, meltability of the vinyl chloride resin composition can be increased.

Note that the "volume-average particle diameter" of vinyl chloride resin particles and vinyl chloride resin fine particles referred to in the present disclosure can be measured in accordance with JIS Z8825 by laser diffraction.

In the presently disclosed vinyl chloride resin composition, a vinyl chloride resin forming the vinyl chloride resin particles preferably has an average degree of polymerization of 5,000 or less. When the average degree of polymerization of the vinyl chloride resin forming the vinyl chloride resin particles is not more than the specific value set forth above, meltability of the vinyl chloride resin composition can be further increased.

Note that the "average degree of polymerization" of a vinyl chloride resin referred to in the present disclosure can be measured in accordance with JIS K6720-2.

In the presently disclosed vinyl chloride resin composition, a vinyl chloride resin forming the vinyl chloride resin fine particles preferably has an average degree of polymerization of 2,600 or less. When the average degree of polymerization of the vinyl chloride resin forming the vinyl chloride resin fine particles is not more than the specific value set forth above, meltability of the vinyl chloride resin composition can be further increased.

In the presently disclosed vinyl chloride resin composition, the (x) plasticizer preferably includes: not less than 7 mass % and less than 49.5 mass % of the (b) trimellitic acid ester; more than 37.5 mass % and not more than 75 mass % of the (c) polyester; not less than 1 mass % and not more than 20 mass % of (d) a dodecanedioic acid diester; and not less than 0 mass % and not more than 5 mass % of (e) a plasticizer other than (b), (c), and (d). When the (x) plasticizer includes the (b) trimellitic acid ester, the (c) polyester, the (d) dodecanedioic acid diester, and the (e) plasticizer other than (b) to (d) in the specific proportions set forth above, it is possible to increase tensile elongation evaluated at low temperature (hereinafter, also referred to as "low-temperature tensile elongation") for a formed vinyl chloride resin molded product after heating thereof.

The presently disclosed vinyl chloride resin composition preferably comprises not less than 66 parts by mass and not more than 200 parts by mass, in total, of the (b) trimellitic acid ester, the (c) polyester, and the (d) dodecanedioic acid diester per 100 parts by mass of the vinyl chloride resin. When the vinyl chloride resin composition contains the specific amount set forth above, in total, of the (b) trimellitic acid ester, the (c) polyester, and the (d) dodecanedioic acid diester, the low-temperature tensile elongation after heating of a formed vinyl chloride resin molded product can be further increased.

In the presently disclosed vinyl chloride resin composition, a mass ratio (c/d) of the (c) polyester and the (d) dodecanedioic acid diester is preferably not less than 3/2 and not more than 10/1. When the mass ratio (c/d) of the (c) polyester and the (d) dodecanedioic acid diester is within the specific range set forth above, the low-temperature tensile elongation after heating of a vinyl chloride resin molded product can be further increased.

The presently disclosed vinyl chloride resin composition is preferably used in powder molding. By using the vinyl chloride resin composition in powder molding in this manner, it is easy to obtain a vinyl chloride resin molded product that can be used well as an automobile interior material such as a surface skin for an automobile instrument panel, for example.

Moreover, the presently disclosed vinyl chloride resin composition is preferably used in powder slush molding. By using the vinyl chloride resin composition in powder slush molding in this manner, it is even easier to obtain a vinyl chloride resin molded product that can be used well as an automobile interior material such as a surface skin for an automobile instrument panel, for example.

Moreover, the present disclosure aims to advantageously solve the problems set forth above, and a presently disclosed vinyl chloride resin molded product is obtained through molding of any one of the vinyl chloride resin compositions set forth above. A vinyl chloride resin molded product that is obtained through molding of the vinyl chloride resin composition set forth above in this manner can maintain low-temperature flexibility well between before and after heating.

The presently disclosed vinyl chloride resin molded product is preferably for an automobile instrument panel surface skin. By using the vinyl chloride resin molded product as a surface skin of an automobile instrument panel in this manner, the produced automobile instrument panel includes a surface skin that can maintain low-temperature flexibility well between before and after heating.

Furthermore, the present disclosure aims to advantageously solve the problems set forth above, and a presently disclosed laminate comprises: a foamed polyurethane molded product; and any one of the vinyl chloride resin molded products set forth above. A laminate that includes a foamed polyurethane molded product and the vinyl chloride resin molded product set forth above has a vinyl chloride resin molded product part that can maintain low-temperature flexibility well between before and after heating.

The presently disclosed laminate is preferably for an automobile instrument panel. When the laminate is used as an automobile instrument panel in this manner, a surface skin of the produced automobile instrument panel can maintain low-temperature flexibility well between before and after heating.

Advantageous Effect

According to the present disclosure, it is possible to provide a vinyl chloride resin composition that has excellent mold staining resistance and that can form a vinyl chloride resin molded product that can maintain low-temperature flexibility well between before and after heating.

Moreover, according to the present disclosure, it is possible to provide a vinyl chloride resin molded product that can maintain low-temperature flexibility well between before and after heating.

Furthermore, according to the present disclosure, it is possible to provide a laminate including the aforementioned vinyl chloride resin molded product.

DETAILED DESCRIPTION

The following provides a detailed description of embodiments of the present disclosure.

The presently disclosed vinyl chloride resin composition can be used, for example, in formation of the presently disclosed vinyl chloride resin molded product. Moreover, a vinyl chloride resin molded product formed using the presently disclosed vinyl chloride resin composition can suitably be used, for example, as an automobile interior material such as a surface skin included in an automobile interior component such as an automobile instrument panel or a door trim.

The presently disclosed vinyl chloride resin molded product can be used, for example, in formation of the presently disclosed laminate. Moreover, a laminate formed using the presently disclosed vinyl chloride resin molded product can suitably be used, for example, as an automobile interior material used in production of an automobile interior component such as an automobile instrument panel or a door trim.

(Vinyl Chloride Resin Composition)

The presently disclosed vinyl chloride resin composition contains: (a) a vinyl chloride resin; and (x) a plasticizer. Features of the presently disclosed vinyl chloride resin composition are that it contains (b) a trimellitic acid ester and (c) a polyester including specific structural units as the (x) plasticizer, the total content of the (b) trimellitic acid ester and the (c) polyester including specific structural units is 65 parts by mass or more per 100 parts by mass of the (a) vinyl chloride resin, and the proportion constituted by the content of the (c) polyester including specific structural units in the total content of the (b) trimellitic acid ester and the (c) polyester including specific structural units is more than 50 mass %.

The presently disclosed vinyl chloride resin composition may optionally further contain other components besides the (a) vinyl chloride resin and the (x) plasticizer.

Moreover, the presently disclosed vinyl chloride resin composition may optionally further contain other plasticizers besides the (b) trimellitic acid ester and the (c) polyester including specific structural units as the (x) plasticizer.

The presently disclosed vinyl chloride resin composition has excellent mold staining resistance and can form a vinyl chloride resin molded product that can maintain low-temperature flexibility well between before and after heating.

Accordingly, the presently disclosed vinyl chloride resin composition can be used, for example, to obtain a vinyl chloride resin molded product that is suitable as an automobile interior material, such as a surface skin for an automobile instrument panel or a surface skin for a door trim, that can maintain low-temperature flexibility well between before and after heating.

Note that from a viewpoint of easily obtaining a vinyl chloride resin molded product that can be used well as an automobile interior material using the presently disclosed vinyl chloride resin composition, for example, the presently disclosed vinyl chloride resin composition is preferably used in powder molding, and is more preferably used in powder slush molding.

<(a) Vinyl Chloride Resin>

A particulate vinyl chloride resin is normally used as the (a) vinyl chloride resin. For example, one type or two or more types of vinyl chloride resin particles can be included as the (a) vinyl chloride resin, and one type or two or more types of vinyl chloride resin fine particles can optionally be further included as the (a) vinyl chloride resin. In particular, the (a) vinyl chloride resin preferably includes at least vinyl chloride resin particles, and more preferably includes vinyl chloride resin particles and vinyl chloride resin fine particles.

Conventionally known production methods such as suspension polymerization, emulsion polymerization, solution polymerization, and bulk polymerization can be used to produce the (a) vinyl chloride resin.

In the present specification, the term "resin particles" is used to refer to particles having a particle diameter of 30 μm or more, whereas the term "resin fine particles" is used to refer to particles having a particle diameter of less than 30 μm.

Examples of the (a) vinyl chloride resin include homopolymers composed of vinyl chloride monomer units and vinyl chloride copolymers preferably comprising 50 mass % or more of vinyl chloride monomer units, and more preferably comprising 70 mass % or more of vinyl chloride monomer units. Specific examples of monomers (comonomers) that are copolymerizable with vinyl chloride monomer and can be used to form a vinyl chloride copolymer include those described in WO2016/098344A1, for example. One of these components may be used individually, or two or more of these components may be used in combination in a freely selected ratio.

<<Vinyl Chloride Resin Particles>>

In the vinyl chloride resin composition, the vinyl chloride resin particles normally function as a matrix resin (base material). The vinyl chloride resin particles are preferably produced by suspension polymerization.

[Average Degree of Polymerization]

The average degree of polymerization of a vinyl chloride resin forming the vinyl chloride resin particles is preferably 800 or more, more preferably 1,000 or more, and even more preferably 1,300 or more, and is preferably 5,000 or less, more preferably 3,000 or less, even more preferably 2,800 or less, particularly preferably 2,300 or less, and further preferably 1,900 or less. This is because sufficient physical strength of a vinyl chloride resin molded product formed using the vinyl chloride resin composition can be ensured while also improving tensile characteristics (particularly tensile elongation), for example, when the average degree of polymerization of the vinyl chloride resin forming the vinyl chloride resin particles is not less than any of the lower limits set forth above. A vinyl chloride resin molded product having good tensile elongation can suitably be used as an automobile interior material, such as a surface skin of an automobile instrument panel, that has excellent ductility and that ruptures as designed without scattering of fragments when an airbag expands and is deployed, for example. Moreover, when the average degree of polymerization of the vinyl chloride resin forming the vinyl chloride resin particles is not more than any of the upper limits set forth above, meltability of the vinyl chloride resin composition can be improved.

[Volume-Average Particle Diameter]

The volume-average particle diameter of the vinyl chloride resin particles is normally 30 μm or more, preferably 50 μm or more, and more preferably 100 μm or more, and is preferably 500 μm or less, and more preferably 200 μm or less. This is because powder fluidity of the vinyl chloride resin composition further improves when the volume-average particle diameter of the vinyl chloride resin particles is not less than any of the lower limits set forth above. Moreover, meltability of the vinyl chloride resin composition improves and surface smoothness of a vinyl chloride resin molded product formed using the composition can be improved when the volume-average particle diameter of the vinyl chloride resin particles is not more than any of the upper limits set forth above.

[Proportional Content]

The proportional content of the vinyl chloride resin particles in the (a) vinyl chloride resin is preferably 70 mass % or more, and more preferably 80 mass % or more, may be 100 mass %, and is preferably 95 mass % or less, and more preferably 90 mass % or less. This is because sufficient physical strength of a vinyl chloride resin molded product formed using the vinyl chloride resin composition can be ensured while also improving tensile elongation when the proportional content of the vinyl chloride resin particles in the (a) vinyl chloride resin is not less than any of the lower limits set forth above. Moreover, powder fluidity of the vinyl chloride resin composition improves when the proportional content of the vinyl chloride resin particles in the (a) vinyl chloride resin is not more than any of the upper limits set forth above.

<<Vinyl Chloride Resin Fine Particles>>

In the vinyl chloride resin composition, the vinyl chloride resin fine particles normally function as a dusting agent (powder fluidity modifier). The vinyl chloride resin fine particles are preferably produced by emulsion polymerization.

[Average Degree of Polymerization]

The average degree of polymerization of a vinyl chloride resin forming the vinyl chloride resin fine particles is preferably 500 or more, and more preferably 700 or more, and is preferably 2,600 or less, and more preferably 2,400 or less. This is because powder fluidity of the vinyl chloride resin composition improves, and tensile elongation of a molded product obtained using the composition improves when the average degree of polymerization of the vinyl chloride resin forming the vinyl chloride resin fine particles serving as a dusting agent is not less than any of the lower limits set forth above. Moreover, meltability of the vinyl chloride resin composition improves, and surface smoothness of a vinyl chloride resin molded product formed using the composition improves when the average degree of polymerization of the vinyl chloride resin forming the vinyl chloride resin fine particles is not more than any of the upper limits set forth above.

[Volume-Average Particle Diameter]

The volume-average particle diameter of the vinyl chloride resin fine particles is normally less than 30 μm, preferably 10 μm or less, and more preferably 5 μm or less, and is preferably 0.1 μm or more, and more preferably 1 μm or more. This is because the vinyl chloride resin fine particles are not too small to function as a dusting agent, for example, and powder fluidity of the vinyl chloride resin composition can be further improved when the volume-average particle diameter of the vinyl chloride resin fine particles is not less than any of the lower limits set forth above. Moreover, meltability of the vinyl chloride resin composition increases, and surface smoothness of a formed vinyl chloride resin molded product can be further improved when the volume-average particle diameter of the vinyl chloride resin fine particles is not more than any of the upper limits set forth above.

[Proportional Content]

The proportional content of the vinyl chloride resin fine particles in the (a) vinyl chloride resin may be 0 mass %, but is preferably 5 mass % or more, and more preferably 10 mass % or more, and is preferably 30 mass % or less, and more preferably 20 mass % or less. This is because powder fluidity of the vinyl chloride resin composition further improves when the proportional content of the vinyl chloride resin fine particles in the (a) vinyl chloride resin is not less than any of the lower limits set forth above. Moreover, physical strength of a vinyl chloride resin molded product formed using the vinyl chloride resin composition can be further increased when the proportional content of the vinyl chloride resin fine particles in the (a) vinyl chloride resin is not more than any of the upper limits set forth above.

<(x) Plasticizer>

The (x) plasticizer includes: (b) a trimellitic acid ester; and (c) a polyester including specific structural units. The (x) plasticizer may further include (d) a dodecanedioic acid diester. Moreover, the (x) plasticizer may further include (e) other plasticizers besides the (b) trimellitic acid ester, the (c) polyester including specific structural units, and the (d) dodecanedioic acid di ester.

The content of the (x) plasticizer (total content of the (b) trimellitic acid ester, (c) polyester including specific structural units, (d) dodecanedioic acid diester, and (e) other plasticizers) in the vinyl chloride resin composition per 100 parts by mass of the (a) vinyl chloride resin is preferably 70 parts by mass or more, more preferably 85 parts by mass or more, and even more preferably 95 parts by mass or more, and is preferably 200 parts by mass or less, more preferably 160 parts by mass or less, and even more preferably 140 parts by mass or less. When the content of the (x) plasticizer is not less than any of the lower limits set forth above, a vinyl chloride resin molded product formed using the vinyl chloride resin composition can maintain low-temperature flexibility even better between before and after heating. Moreover, when the content of the (x) plasticizer is not less than any of the lower limits set forth above, low-temperature flexibility of a vinyl chloride resin molded product formed using the vinyl chloride resin composition can be increased. The meltability of the vinyl chloride resin composition can also be increased when the content of the (x) plasticizer is not less than any of the lower limits set forth above. On the other hand, stickiness of the surface of a vinyl chloride resin molded product formed using the vinyl chloride resin composition can be suppressed when the content of the (x) plasticizer is not more than any of the upper limits set forth above.

<<(b) Trimellitic Acid Ester>>

The (b) trimellitic acid ester is preferably an ester compound of trimellitic acid and a monohydric alcohol.

Specific examples of the monohydric alcohol include, but are not specifically limited to, aliphatic alcohols such as 1-hexanol, 1-heptanol, 1-octanol, 2-ethylhexanol, 1-nonanol, 1-decanol, 1-undecanol, and 1-dodecanol. Of these examples, an aliphatic alcohol having a carbon number of 6 to 18 is preferable as the monohydric alcohol, and a linear aliphatic alcohol having a carbon number of 6 to 18 is more preferable as the monohydric alcohol.

In particular, the (b) trimellitic acid ester is preferably a triester compound in which substantially all the carboxy groups of trimellitic acid are esterified with the monohydric alcohol. Alcohol residue portions of the triester compound may all be derived from the same alcohol or may each be derived from a different alcohol.

The (b) trimellitic acid ester may be one compound or a mixture of different compounds.

Specific examples of the (b) trimellitic acid ester that are suitable include tri-n-hexyl trimellitate, tri-n-heptyl trimellitate, tri-n-octyl trimellitate, tri(2-ethylhexyl) trimellitate, tri-n-nonyl trimellitate, tri-n-decyl trimellitate, triisodecyl trimellitate, tri-n-undecyl trimellitate, tri-n-dodecyl trimellitate, trialkyl trimellitates (esters including two or more types of alkyl groups having different carbon numbers [with a proviso that the carbon number is 6 to 18] in a molecule), tri-n-alkyl trimellitates (esters including two or more types of alkyl groups having different carbon numbers [with a proviso that the carbon number is 6 to 18] in a molecule), and mixtures thereof.

Specific examples of the (b) trimellitic acid ester that are more preferable include tri-n-octyl trimellitate, tri(2-ethylhexyl) trimellitate, tri-n-nonyl trimellitate, tri-n-decyl trimellitate, tri-n-alkyl trimellitates (esters including two or more types of alkyl groups having different carbon numbers [with a proviso that the carbon number is 6 to 18] in a molecule), and mixtures thereof.

The content of the (b) trimellitic acid ester in the vinyl chloride resin composition per 100 parts by mass of the (a) vinyl chloride resin is preferably 5 parts by mass or more, more preferably 10 parts by mass or more, and even more preferably 15 parts by mass or more, and is preferably 70 parts by mass or less, more preferably 60 parts by mass or less, and even more preferably 50 parts by mass or less. When the content of the (b) trimellitic acid ester in the vinyl chloride resin composition is not less than any of the lower limits set forth above, meltability of the vinyl chloride resin composition can be increased. Mold staining resistance of the vinyl chloride resin composition can also be further increased when the content of the (b) trimellitic acid ester in the vinyl chloride resin composition is not less than any of the lower limits set forth above. On the other hand, when the content of the (b) trimellitic acid ester in the vinyl chloride resin composition is not more than any of the upper limits set forth above, a vinyl chloride resin molded product formed using the vinyl chloride resin composition can maintain low-temperature flexibility even better between before and after heating. The low-temperature flexibility of a vinyl chloride resin molded product formed using the vinyl chloride resin composition can also be increased when the content of the (b) trimellitic acid ester in the vinyl chloride resin composition is not more than any of the upper limits set forth above.

<<(c) Polyester Including Specific Structural Units>>

The (c) polyester including specific structural units includes a structural unit derived from adipic acid and a structural unit derived from 3-methyl-1,5-pentanediol.

Note that although the (c) polyester including specific structural units may include structural units other than the structural unit derived from adipic acid and the structural unit derived from 3-methyl-1,5-pentanediol, the total of the structural unit derived from adipic acid and the structural unit derived from 3-methyl-1,5-pentanediol is preferably 50 mass % or more of all structural units, and more preferably 80 mass % or more of all structural units. Moreover, it is preferable that the (c) polyester including specific structural units only includes the structural unit derived from adipic acid and the structural unit derived from 3-methyl-1,5-pentanediol as repeating units.

The (c) polyester including specific structural units can be obtained through condensation polymerization of adipic acid and 3-methyl-1,5-pentanediol without any specific limitations. This condensation polymerization can be performed in the presence of a catalyst. Moreover, the condensation polymerization can be performed using an alcohol and/or a monobasic acid as a terminal stopping component. The condensation polymerization of adipic acid and 3-methyl-1,5-pentanediol and the termination reaction of the obtained polycondensate and the terminal stopping component may be performed in one go or may be performed separately. A product that is obtained through the condensation polymerization and the termination reaction may be subjected to after-treatment such as distillation. Commonly known conditions can be adopted as the reaction conditions of the condensation polymerization, such as the used amounts of the monomers, the catalyst, and the terminal stopping component.

Also note that a commercially available product may be used as the (c) polyester including specific structural units.

The catalyst used in the condensation polymerization reaction is not specifically limited and may be dibutyltin oxide, tetraalkyl titanate, or the like, for example.

Examples of alcohols that can be used as the terminal stopping component include methanol, ethanol, propanol, isopropanol, butanol, isobutanol, pentanol, hexanol, isohexanol, heptanol, isoheptanol, octanol, isooctanol, 2-ethylhexanol, nonanol, isononanol, decanol, isodecanol, undecanol, isoundecanol, dodecanol, tridecanol, isotridecanol, tetradecanol, pentadecanol, hexadecanol, heptadecanol, octadecanol, cellosolve, carbitol, phenol, nonylphenol, benzyl alcohol, and mixtures thereof.

Examples of monobasic acids that can be used as the terminal stopping component include acetic acid, propionic acid, butyric acid, isobutyric acid, valeric acid, pivalic acid, caproic acid, heptanoic acid, caprylic acid, 2-ethylhexanoic acid, pelargonic acid, capric acid, undecanoic acid, lauric acid, tridecanoic acid, myristic acid, pentadecanoic acid, palmitic acid, heptadecanoic acid, stearic acid, benzoic acid, and mixtures thereof.

Of these examples, 2-ethylhexanol is preferable as the terminal stopping component.

The number-average molecular weight of the (c) polyester including specific structural units is preferably 1,000 or more, and more preferably 2,000 or more, and is preferably 10,000 or less, and more preferably 7,000 or less.

Note that the "number-average molecular weight" can be measured by VPO (vapor pressure osmometry).

Moreover, the (c) polyester including specific structural units preferably has an acid value of 1 or less.

Furthermore, the (c) polyester including specific structural units preferably has a hydroxyl value of 30 or less.

The viscosity of the (c) specific polyester is preferably 500 mPa·s or more, and more preferably 1,000 mPa·s or more, and is preferably 8,000 mPa·s or less, and more preferably 5,000 mPa·s or less.

Note that the "viscosity" can be measured in accordance with JIS Z8803 at a temperature of 23° C.

The content of the (c) polyester including specific structural units in the vinyl chloride resin composition per 100 parts by mass of the (a) vinyl chloride resin is preferably 30 parts by mass or more, more preferably 40 parts by mass or more, and even more preferably 50 parts by mass or more, and is preferably 150 parts by mass or less, more preferably 100 parts by mass or less, even more preferably 90 parts by mass or less, and particularly preferably 80 parts by mass or less. When the content of the (c) polyester including specific structural units in the vinyl chloride resin composition is not less than any of the lower limits set forth above, a vinyl chloride resin molded product formed using the vinyl chloride resin composition can maintain low-temperature flexibility even better between before and after heating. The low-temperature flexibility of a vinyl chloride resin molded product formed using the vinyl chloride resin composition can also be increased when the content of the (c) polyester including specific structural units in the vinyl chloride resin composition is not less than any of the lower limits set forth above. On the other hand, when the content of the (c) polyester including specific structural units in the vinyl chloride resin composition is not more than any of the upper limits set forth above, meltability of the vinyl chloride resin composition can be increased. Mold staining resistance of the vinyl chloride resin composition can also be further increased when the content of the (c) polyester including specific structural units in the vinyl chloride resin composition is not more than any of the upper limits set forth above.

<<Relationship of (b) and (c)>>

The total content of the (b) trimellitic acid ester and the (c) polyester including specific structural units in the vinyl chloride resin composition per 100 parts by mass of the (a) vinyl chloride resin is required to be 65 parts by mass or more, is preferably 80 parts by mass or more, and more preferably 90 parts by mass or more, and is preferably 200 parts by mass or less, more preferably 160 parts by mass or less, and even more preferably 140 parts by mass or less. Through the total content of the (b) trimellitic acid ester and the (c) polyester including specific structural units being not less than any of the lower limits set forth above, a vinyl chloride resin molded product formed using the vinyl chloride resin composition can maintain low-temperature flexibility well between before and after heating. Moreover, the low-temperature flexibility of a vinyl chloride resin molded product formed using the vinyl chloride resin composition can be further increased when the total content of the (b) trimellitic acid ester and the (c) polyester including specific structural units is not less than any of the lower limits set forth above. Furthermore, the vinyl chloride resin composition can display excellent meltability when the total content of the (b) trimellitic acid ester and the (c) polyester including specific structural units is 90 parts by mass or more per 100 parts by mass of the (a) vinyl chloride resin. On the other hand, when the total content of the (b) trimellitic acid ester and the (c) polyester including specific structural units is not more than any of the upper limits set forth above, stickiness of the surface of a vinyl chloride resin molded product formed using the vinyl chloride resin composition can be suppressed.

The proportion constituted by the content of the (c) polyester including specific structural units in the total content of the (b) trimellitic acid ester and the (c) polyester including specific structural units in the vinyl chloride resin composition is required to be more than 50 mass %, and is preferably more than 52 mass %, more preferably more than 55 mass %, and even more preferably more than 70 mass %. Through the proportion constituted by the content of the (c) polyester including specific structural units in the total content of the (b) trimellitic acid ester and the (c) polyester including specific structural units being more than 50 mass %, a vinyl chloride resin molded product formed using the vinyl chloride resin composition can maintain low-temperature flexibility well between before and after heating. Moreover, the low-temperature flexibility of a vinyl chloride resin molded product formed using the vinyl chloride resin composition can be increased when the proportion constituted by the content of the (c) polyester including specific structural units in the total content of the (b) trimellitic acid ester and the (c) polyester including specific structural units is more than any of the lower limits set forth above.

Note that the proportion constituted by the content of the (c) polyester including specific structural units in the total content of the (b) trimellitic acid ester and the (c) polyester including specific structural units in the vinyl chloride resin composition is required to be less than 100 mass %, and is preferably less than 98 mass %, more preferably less than 95 mass %, and even more preferably less than 92 mass %. Through the proportion constituted by the content of the (c) polyester including specific structural units in the total content of the (b) trimellitic acid ester and the (c) polyester including specific structural units being less than 100 mass %, mold staining resistance of the vinyl chloride resin composition can be sufficiently increased. Moreover, meltability of the vinyl chloride resin composition can be increased when the proportion constituted by the content of the (c) polyester including specific structural units in the total content of the (b) trimellitic acid ester and the (c) polyester including specific structural units is less than any of the upper limits set forth above.

<<(d) Dodecanedioic Acid Diester>>

The (x) plasticizer may further include (d) a dodecanedioic acid diester in addition to the (b) trimellitic acid ester and the (c) polyester including specific structural units described above. The further inclusion of the (d) dodecanedioic acid diester in the (x) plasticizer, in addition to the (b) trimellitic acid ester and the (c) polyester including specific structural units described above, can increase the low-temperature tensile elongation after heating of a formed vinyl chloride resin molded product.

According to Table 2 in paragraph 0082 of WO2015/141181A1, vinyl chloride resin molded products obtained through molding of vinyl chloride resin compositions of Examples 2 to 6, which each contained (d) a dodecanedioic acid diester (bis(2-ethylhexyl) dodecanedioate), had good low values for peak top temperature and embrittlement temperature compared to a vinyl chloride resin molded product obtained through molding of a vinyl chloride resin composition of Comparative Example 1, which did not contain (d) a dodecanedioic acid diester, but had a similar or lower value for low-temperature (−35° C.) tensile elongation after being heated (130° C.) for 250 hours. For this reason, (d) a dodecanedioic acid diester in a vinyl chloride resin composition is thought to contribute to improving flexibility at low temperatures of a formed vinyl chloride resin molded product but to not contribute to improving low-temperature tensile elongation after heating in the conventional art.

However, a vinyl chloride resin composition obtained by further using (d) a dodecanedioic acid diester as a plasticizer in addition to the (b) trimellitic acid ester and the (c) polyester including specific structural units described above was found to be capable of forming a vinyl chloride resin molded product having excellent low-temperature tensile elongation after heating, though the reason for this is not clear.

The low-temperature flexibility of a formed vinyl chloride resin molded product can also be increased when the (x) plasticizer further includes (d) a dodecanedioic acid diester in addition to the (b) trimellitic acid ester and the (c) polyester including specific structural units described above.

The (d) dodecanedioic acid diester that can be included in the (x) plasticizer is formed of a diester obtained through esterification of an alcohol and dodecanedioic acid, or an alkylated product of dodecanedioic acid. The alcohol that is esterification with dodecanedioic acid may be an aliphatic alcohol, an alicyclic alcohol, or an aromatic alcohol. The alcohol is preferably an aliphatic alcohol. The alcohol may be one type of alcohol or a combination of two or more types of alcohols. The carbon number of the alcohol is preferably not less than 6 and not more than 12, and more preferably not less than 8 and not more than 10.

Specific examples of dodecanedioic acid diesters include dimethyl dodecanedioate, diethyl dodecanedioate, dipropyl dodecanedioate, diisopropyl dodecanedioate, dibutyl dodecanedioate, diisobutyl dodecanedioate, dipentyl dodecanedioate, diisopentyl dodecanedioate, dihexyl dodecanedioate, diisohexyl dodecanedioate, diheptyl dodecanedioate, diisoheptyl dodecanedioate, di-n-octyl dodecanedioate, diisooctyl dodecanedioate, bis(2-ethylhexyl) dodecanedioate, n-octyl (2-ethylhexyl) dodecanedioate, di-n-nonyl dodecanedioate, diisononyl dodecanedioate, n-nonyl (isononyl) dodecanedioate, di-n-decyl dodecanedioate, diisodecyl dodecanedioate, n-decyl (isodecyl) dodecanedioate, n-octyl (n-decyl) dodecanedioate, n-decyl (2-ethylhexyl) dodecanedioate, di-n-undecyl dodecanedioate, diisoundecyl dodecanedioate, n-undecyl (isoundecyl) dodecanedioate, di-n-dodecyl dodecanedioate, diisododecyl dodecanedioate, n-dodecyl (isododecyl) dodecanedioate, n-octyl (n-dodecyl) dodecanedioate, n-dodecyl (2-ethylhexyl) dodecanedioate, n-decyl (n-dodecyl) dodecanedioate, bis(2-ethylhexyl) α-methyl dodecanedioate, bis(2-ethylhexyl) α-ethyl dodecanedioate, bis(2-ethylhexyl) α-isopropyldodecanedioate, bis(2-ethylhexyl) β-methyldodecanedioate, bis(2-ethylhexyl) β-ethyl dodecanedioate, bis(2-ethylhexyl) β-isopropyldodecanedioate, bis(2-ethylhexyl) γ-methyldodecanedioate, bis(2-ethylhexyl) γ-ethyldodecanedioate, bis(2-ethylhexyl) γ-isopropyldodecanedioate, bis(2-ethylhexyl) α,β-dimethyldodecanedioate, bis(2-ethylhexyl) α,β-diethyldodecanedioate, and bis(2-ethylhexyl) α,β-diisopropyldodecanedioate. Preferable (d) dodecanedioic acid diesters are dodecanedioic acid diesters that are formed from dodecanedioic acid and an aliphatic alcohol having a carbon number of 6 to 12, more preferable (d) dodecanedioic acid diesters are dodecanedioic acid diesters that are formed from dodecanedioic acid and an aliphatic alcohol having a carbon number of 8 to 10, even more preferable (d) dodecanedioic acid diesters are dodecanedioic acid diesters that are formed from dodecanedioic acid and an aliphatic alcohol having a carbon number of 8, and a particularly preferable (d) dodecanedioic acid diester is bis(2-ethylhexyl) dodecanedioate. The (d) dodecanedioic acid diester may be one type of dodecanedioic acid diester used individually or two or more types of dodecanedioic acid diesters used in combination.

By using any of the examples described above as the (d) dodecanedioic acid diester, it is possible to increase the low-temperature flexibility and the low-temperature tensile elongation after heating of a vinyl chloride resin molded product obtained through molding of the vinyl chloride resin composition.

The content of the (d) dodecanedioic acid diester in the vinyl chloride resin composition per 100 parts by mass of the (a) vinyl chloride resin is preferably 4 parts by mass or more, more preferably 6 parts by mass or more, and even more preferably 8 parts by mass or more, and is preferably 24 parts by mass or less, more preferably 21 parts by mass or less, and even more preferably 18 parts by mass or less. When the content of the (d) dodecanedioic acid diester in the vinyl chloride resin composition is within any of the ranges set forth above, the low-temperature flexibility and the low-temperature tensile elongation after heating of a formed vinyl chloride resin molded product can be further increased.

<<Proportional Content of Each Plasticizer>>

In a case in which the (x) plasticizer further includes the (d) dodecanedioic acid diester in addition to the (b) trimellitic acid ester and the (c) polyester including specific structural units, the proportional content of each plasticizer among the (b) trimellitic acid ester, the (c) polyester including specific structural units, the (d) dodecanedioic acid diester, and (e) other plasticizers in the (x) plasticizer is preferably within a specific range. When the (b) trimellitic acid ester, the (c) polyester including specific structural units, the (d) dodecanedioic acid diester, and (e) other plasticizers are each included in the (x) plasticizer with a specific proportional content, the low-temperature flexibility and the low-temperature tensile elongation after heating of a formed vinyl chloride resin molded product can be further increased.

Specifically, the proportional content of the (b) trimellitic acid ester in the (x) plasticizer is preferably 7 mass % or more, and more preferably 25 mass % or more, and is preferably less than 49.5 mass %. When the proportional content of the (b) trimellitic acid ester in the (x) plasticizer is within any of the specific ranges set forth above, the low-temperature flexibility and the low-temperature tensile elongation after heating of a formed vinyl chloride resin molded product can be further increased.

The proportional content of the (c) polyester including specific structural units in the (x) plasticizer is preferably more than 37.5 mass %, and more preferably more than 49 mass %, and is preferably 75 mass % or less, more preferably 55 mass % or less, even more preferably 54 mass % or less, and further preferably 53 mass % or less. When the proportional content of the (c) polyester including specific structural units in the (x) plasticizer is within any of the ranges set forth above, the flexibility at low temperature and the low-temperature tensile elongation after heating of a formed vinyl chloride resin molded product can be further increased.

The proportional content of the (d) dodecanedioic acid diester in the (x) plasticizer is preferably 1 mass % or more, more preferably 5 mass % or more, even more preferably 6 mass % or more, and further preferably 7 mass % or more, and is preferably 20 mass % or less, more preferably 19 mass % or less, and even more preferably 18 mass % or less. When the proportional content of the (d) dodecanedioic acid diester in the (x) plasticizer is within any of the ranges set forth above, the flexibility at low temperature and the low-temperature tensile elongation after heating of a formed vinyl chloride resin molded product can be further increased.

The proportional content of (e) other plasticizers in the (x) plasticizer is preferably not less than 0 mass % and not more than 5 mass %. When the proportional content of (e) other plasticizers in the (x) plasticizer is within the range set forth above, the low-temperature tensile elongation after heating of a formed vinyl chloride resin molded product can be further increased.

<<Relationship of (b), (c), and (d)>>

The total content of the (b) trimellitic acid ester, the (c) polyester including specific structural units, and the (d) dodecanedioic acid diester in the vinyl chloride resin composition per 100 parts by mass of the (a) vinyl chloride resin is preferably 30 parts by mass or more, more preferably 60 parts by mass or more, even more preferably 66 parts by mass or more, and further preferably 80 parts by mass or more, and is preferably 200 parts by mass or less, more preferably 160 parts by mass or less, and even more preferably 140 parts by mass or less. When the total content of the (b) trimellitic acid ester, the (c) polyester including specific structural units, and the (d) dodecanedioic acid diester in the vinyl chloride resin composition is within any of the ranges set forth above, the low-temperature flexibility and the low-temperature tensile elongation after heating of a formed vinyl chloride resin molded product can be further increased.

<<Relationship of (c) and (d)>>

A mass ratio (c/d) of the (c) polyester and the (d) dodecanedioic acid diester in the vinyl chloride resin composition is preferably 3/2 or more, more preferably 7/4 or more, and even more preferably 2/1 or more, and is preferably 10/1 or less, more preferably 6/1 or less, and even more preferably 3/1 or less. When the mass ratio (c/d) of the (c) polyester and the (d) dodecanedioic acid diester is within any of the specific ranges set forth above, the low-temperature tensile elongation after heating of a formed vinyl chloride resin molded product can be further increased.

<<Other Plasticizers>>

The (x) plasticizer contained in the vinyl chloride resin composition may optionally further include plasticizers ((e) other plasticizers) besides the (b) trimellitic acid ester, the (c) polyester including specific structural units, and the (d) dodecanedioic acid diester described above.

Specific examples of (e) other plasticizers include plasticizers other than the (b) trimellitic acid ester, (c) polyester including specific structural units, and (d) dodecanedioic acid diester described above from among plasticizers described in WO2016/098344A1. Of these plasticizers, the use of epoxidized soybean oil is preferable from a viewpoint of inhibiting reduction of low-temperature flexibility of a formed vinyl chloride resin molded product between before and after heating.

The content of (e) other plasticizers in the vinyl chloride resin composition can be set as not less than 0 parts by mass and not more than 5 parts by mass per 100 parts by mass of the (a) vinyl chloride resin.

<Additives>

The presently disclosed vinyl chloride resin composition may further contain various additives besides the components set forth above. Examples of additives that may be used include, but are not specifically limited to, lubricants; stabilizers such as perchloric acid-treated hydrotalcite, zeolites, β-diketones, and fatty acid metal salts; mold release agents; dusting agents other than the previously described vinyl chloride resin fine particles; impact modifiers; perchloric acid compounds other than perchloric acid-treated hydrotalcite (for example, sodium perchlorate and potassium perchlorate); antioxidants; fungicides; flame retardants; antistatic agents; fillers; light stabilizers; foaming agents; and pigments.

Additives that are described in WO2016/098344A1, for example, can be used as the aforementioned additives that can be contained in the presently disclosed vinyl chloride resin composition, and suitable amounts thereof may also be the same as described in WO2016/098344A1.

Moreover, the presently disclosed vinyl chloride resin composition preferably contains silicone oil. The inclusion of the silicone oil can further increase mold staining resistance of the vinyl chloride resin composition.

Examples of silicone oils that can be contained in the vinyl chloride resin composition include silicone oils described in JP2018-35304A and the like.

The content of silicone oil in the vinyl chloride resin composition per 100 parts by mass of the (a) vinyl chloride resin is preferably 0.1 parts by mass or more, and more preferably 0.2 parts by mass or more, and is preferably 1 part by mass or less, and more preferably 0.8 parts by mass or less. When the content of silicone oil in the vinyl chloride resin composition is within any of the specific ranges set forth above, mold staining resistance of the vinyl chloride resin composition can be even further increased.

<Production Method of Vinyl Chloride Resin Composition>

The presently disclosed vinyl chloride resin composition can be produced by mixing the components described above.

Although no specific limitations are placed on the method by which the (a) vinyl chloride resin, the (x) plasticizer including at least the (b) trimellitic acid ester and the (c) polyester including specific structural units, and various additives that are used as necessary are mixed, a method in which components other than a dusting agent (inclusive of vinyl chloride resin fine particles) are mixed by dry blending and then the dusting agent is subsequently added and mixed therewith may be adopted. The dry blending is preferably carried out using a Henschel mixer. Although the temperature during dry blending is not specifically limited, the temperature is preferably 50° C. or higher, and more preferably 70° C. or higher, and is preferably 200° C. or lower.

<Use of Vinyl Chloride Resin Composition>

The obtained vinyl chloride resin composition can suitably be used in powder molding, and can more suitably be used in powder slush molding.

(Vinyl Chloride Resin Molded Product)

A feature of the presently disclosed vinyl chloride resin molded product is that it is obtained by molding the vinyl chloride resin composition set forth above by any method. As a result of the presently disclosed vinyl chloride resin molded product being formed using the vinyl chloride resin composition set forth above, the presently disclosed vinyl chloride resin molded product normally contains at least the (a) vinyl chloride resin and also the (b) trimellitic acid ester and (c) polyester including specific structural units that are used as the (x) plasticizer, contains the (b) trimellitic acid ester and the (c) polyester including specific structural units with a total content that is not less than the previously described specific value, and contains the (c) polyester including specific structural units with a content that constitutes a proportion of more than 50 mass % in the aforementioned total content. The presently disclosed vinyl chloride resin molded product can maintain low-temperature flexibility well between before and after heating.

Consequently, the presently disclosed vinyl chloride resin molded product can suitably be used as an automobile interior material such as a surface skin of an automobile instrument panel that has excellent ductility and that ruptures as designed without scattering of fragments when an airbag expands and is deployed, for example, even in a state in which it is left at low temperature after having been left at high temperature.

<Formation Method of Vinyl Chloride Resin Molded Product>

In a case in which the vinyl chloride resin molded product is formed by powder slush molding, the mold temperature in powder slush molding is not specifically limited but is preferably 200° C. or higher, and more preferably 220° C. or higher, and is preferably 300° C. or lower, and more preferably 280° C. or lower.

The following method, for example, may be used in production of the vinyl chloride resin molded product without any specific limitations. In this method, the presently disclosed vinyl chloride resin composition is sprinkled onto a mold having a temperature within any of the ranges set forth above. The vinyl chloride resin composition is initially left for not less than 5 seconds and not more than 30 seconds and, after shaking off any excess vinyl chloride resin composition, is then further left for not less than 30 seconds and not more than 3 minutes at an arbitrary temperature. The mold is subsequently cooled to a temperature of not lower than 10° C. and not higher than 60° C., and the presently disclosed vinyl chloride resin molded product that is obtained is removed from the mold. A sheet-like molded product that imitates the shape of the mold is obtained.

Note that as a result of the presently disclosed vinyl chloride resin composition set forth above being used in the method described above, staining of the mold after removal of the obtained vinyl chloride resin molded product can be inhibited.

(Laminate)

The presently disclosed laminate includes a foamed polyurethane molded product and the vinyl chloride resin molded product set forth above. The vinyl chloride resin molded product typically constitutes one surface of the laminate.

As a result of the presently disclosed laminate including a vinyl chloride resin molded product that is formed using the presently disclosed vinyl chloride resin composition and that can maintain low-temperature flexibility well between before and after heating, the presently disclosed laminate can, for example, suitably be used as an automobile interior material forming an automobile interior component (particularly an automobile instrument panel).

The method by which the foamed polyurethane molded product and the vinyl chloride resin molded product are stacked is not specifically limited and may, for example, be a method such as described below. Specifically, (1) a method in which the foamed polyurethane molded product and the vinyl chloride resin molded product are separately prepared and are subsequently adhered to one another by thermal fusion bonding, thermal adhesion, or using a commonly known adhesive, or (2) a method in which raw materials of the foamed polyurethane molded product such as an isocyanate and a polyol are caused to react and polymerize on the vinyl chloride resin molded product while carrying out polyurethane foaming by a commonly known method to directly form the foamed polyurethane molded product on the vinyl chloride resin molded product may be adopted. The latter method (2) is more suitable because it involves a simple process and enables laminates of various different shapes to be obtained while easily achieving strong adhesion of the vinyl chloride resin molded product and the foamed polyurethane molded product.

EXAMPLES

The following provides a more specific description of the present disclosure based on examples. However, the present disclosure is not limited to the following examples. In the following description, "%" and "parts" used in expressing quantities are by mass, unless otherwise specified.

The following methods were used to measure and evaluate the melting temperature and mold staining resistance of a vinyl chloride resin composition and the pre-heating (initial) and post-heating (heat aging test) low-temperature flexibility and low-temperature tensile elongation of a vinyl chloride resin molded product.

<Melting Temperature>

The melting temperature of a vinyl chloride resin composition obtained in each example or comparative example was measured using a heated mold. Specifically, a gradation-heated mold was obtained by placing the mold on a heating plate that was gradation heated at equal intervals in a range of from 170° C. to 270° C. The vinyl chloride resin composition was sprinkled onto the gradation-heated mold such as to have a thickness of 1 mm and was left for 30 seconds to cause melting thereof. Next, excess vinyl chloride resin composition was shaken off, the mold was cooled by water, and a vinyl chloride resin molded sheet obtained through molding of the vinyl chloride resin in a belt-shape in this manner was removed from the mold. The surface of the vinyl chloride resin molded sheet that had been removed from the mold was visually inspected, and the temperature of a location at which melting had occurred was taken to be the melting temperature. Note that the location at which melting had occurred was judged to be a location where the vinyl chloride resin molded sheet that had been molded had a smooth surface without the shape of particles remaining. A lower melting temperature indicates that the vinyl chloride resin composition has better meltability.

<Mold Staining Resistance>

A vinyl chloride resin composition obtained in each example or comparative example was sprinkled onto a textured mold that had been cleaned by sandblasting and subsequently heated to a temperature of 250° C., was left to melt for an arbitrary time, and then excess vinyl chloride resin composition was shaken off. Thereafter, the textured mold onto which the vinyl chloride resin composition had been sprinkled was placed at rest in an oven set to a temperature of 200° C., and once 60 seconds had passed after being placed at rest, the textured mold was cooled with cooling water. Once the mold temperature had dropped to 40° C., a 145 mm×175 mm×1 mm vinyl chloride resin molded sheet was removed from the textured mold as a vinyl chloride resin molded product. The operations of heating, molding, and cooling described above were repeated five times, and then a region of 10 cm×10 cm at the surface of the textured mold was observed using a microscope. The number of particles having a circle-equivalent diameter of 100 μm or more that were present inside the region was measured, and then mold staining resistance of the vinyl chloride resin composition was evaluated in accordance with the following standard. A smaller number of particles having a circle-equivalent diameter of 100 μm or more indicates that the vinyl chloride resin composition has better mold staining resistance.

A: Less than 500
B: Not less than 500 and less than 1,000
C: 1,000 or more

<Low-Temperature Flexibility>
<<Pre-Heating (Initial)>>

A vinyl chloride resin molded sheet (dimensions: 145 mm×175 mm×1 mm) obtained in each example or comparative example was punched out with dimensions of 10 mm×40 mm, and then a loss modulus peak top temperature was measured in accordance with JIS K7244-4 with a frequency of 10 Hz, a measurement temperature range of −90° C. to +100° C., and a heating rate of 2° C./min. Note that a lower peak top temperature indicates that the vinyl chloride resin molded sheet has better pre-heating (initial) low-temperature flexibility.

<<Post-Heating (Heat Aging Test)>>

A vinyl chloride resin molded sheet (dimensions: 145 mm×175 mm×1 mm) obtained in each example or comparative example was placed on a plate (dimensions: 230 mm×320 mm×3 mm) made of polyurethane that had a DURO-A hardness of 90°, and was then sandwiched from above and below by 250 mm×340 mm×2 mm aluminum plates. In a state with a 2 kg weight placed thereon, heating was performed at 120° C. for 1 week inside an oven. Thereafter, the weight was removed, the sample was taken out of the oven and restored to room temperature, and then the aluminum plates were removed, and the vinyl chloride resin molded sheet was peeled from the polyurethane plate. The post-heating (heat aging test) vinyl chloride resin molded sheet that was obtained was used to measure a loss modulus peak top temperature through the same operations and conditions as for pre-heating. A lower peak top temperature indicates that the vinyl chloride resin molded sheet has better post-heating (heat aging test) low-temperature flexibility.

<<Maintenance of Low-Temperature Flexibility Between Before and After Heating>>

The difference between the loss modulus peak top temperature of the vinyl chloride resin molded sheet before heating and the loss modulus peak top temperature of the vinyl chloride resin molded sheet after heating was determined in order to evaluate the degree to which low-temperature flexibility was maintained between before and after heating. A smaller difference between the loss modulus peak top temperature before heating and the loss modulus peak top temperature after heating indicates that the vinyl chloride resin molded sheet maintains low-temperature flexibility better between before and after heating.

<Low-Temperature Tensile Elongation>

<<Pre-Heating (Initial)>>

An obtained vinyl chloride resin molded sheet was punched out by a No. 1 Dumbbell described in JIS K6251, and then tensile breaking elongation (%) at a low temperature of −10° C. was measured in accordance with JIS K7113 at a tensing rate of 200 mm/min. A larger value for the tensile breaking elongation indicates that the vinyl chloride resin molded sheet has better pre-heating (initial) low-temperature tensile elongation.

<<Post-Heating (Heat Aging Test)>>

A laminate lined with a foamed polyurethane molded product was used as a sample. The sample was placed in an oven and was heated in an environment having a temperature of 120° C. for 500 hours. Thereafter, the foamed polyurethane molded product was peeled from the laminate that had been heated so as to prepare just a vinyl chloride resin molded sheet. The tensile breaking elongation (%) of the vinyl chloride resin molded sheet after 500 hours of heating was measured under the same conditions as at the initial stage described above. A larger value for the tensile breaking elongation indicates that the vinyl chloride resin molded sheet has better post-heating (heat aging test) low-temperature tensile elongation.

(Production Example)

A polyester used in the examples and comparative examples was produced as follows.

<Polyester A>

Adipic acid as a polybasic carboxylic acid, 3-methyl-1,5-pentanediol as a polyhydric alcohol, and 2-ethylhexanol as a stopper (terminal stopping component) were charged to a reactor, tetraisopropyl titanate was added as a catalyst, solvent was added as appropriate, and heating thereof was performed under stirring. Water produced as a by-product was removed at normal pressure and at reduced pressure, and the temperature was finally raised to 220° C. to 230° C. to complete a dehydration condensation reaction. The obtained product was then subjected to thin-film evaporation under conditions of a pressure of 4 Pa to 80 Pa and a jacket temperature of 250° C. to yield a polyester A (viscosity: 3,600 mPa·s; number-average molecular weight: 5,300; acid value: 0.32; hydroxyl value: 12.7) including 2-ethylhexoxy groups at the terminals thereof.

Example 1

<Production of Vinyl Chloride Resin Composition>

With the exception of plasticizers (trimellitic acid ester, polyester A, and epoxidized soybean oil) and vinyl chloride resin fine particles used as a dusting agent, the ingredients indicated in Table 1 were loaded into and mixed in a Henschel mixer. The temperature of the mixture was raised to 80° C., at which point, all the plasticizers were added, and drying up of the mixture was caused to occur (i.e., the mixture changed to a dry state through absorption of the plasticizers by vinyl chloride resin particles used as a vinyl chloride resin). Thereafter, once the dried-up mixture had been cooled to 70° C. or lower, the vinyl chloride resin fine particles used as the dusting agent were added to the mixture to produce a vinyl chloride resin composition.

The obtained vinyl chloride resin composition was used to evaluate the melting temperature and mold staining resistance. The results are shown in Table 1.

<Formation of Vinyl Chloride Resin Molded Product>

A vinyl chloride resin molded sheet having dimensions of 145 mm×175 mm×1 mm was produced as described below. Specifically, the vinyl chloride resin composition obtained as described above was sprinkled onto a textured mold that was heated to a temperature of 250° C. and, after being left to melt for an arbitrary time, excess vinyl chloride resin composition was shaken off. Thereafter, the textured mold onto which the vinyl chloride resin composition had been sprinkled was placed at rest in an oven set to a temperature of 200° C., and once 60 seconds had passed after being placed at rest, the textured mold was cooled with cooling water. Once the mold temperature had dropped to 40° C., a vinyl chloride resin molded sheet was removed from the mold as a vinyl chloride resin molded product.

Pre-heating (initial) and post-heating (heat aging test) low-temperature flexibility were evaluated for the obtained vinyl chloride resin molded sheet (dimensions: 145 mm×175 mm×1 mm) by the previously described methods. The results are shown in Table 1.

Examples 2 to 7 and Comparative Examples 1 to 5

A vinyl chloride resin composition and a vinyl chloride resin molded product were produced in the same way as in Example 1 with the exception that the used amounts of the trimellitic acid ester and the polyester A were changed as shown in Table 1. Measurements and evaluations were made in the same manner as in Example 1. The results are shown in Table 1.

Note that the melting temperature of the vinyl chloride resin composition obtained in Comparative Example 5 could not be measured because the vinyl chloride resin composition did not display sufficient meltability. Moreover, when formation of a vinyl chloride resin molded product was attempted using the vinyl chloride resin composition obtained in Comparative Example 5, powder molding could not be performed appropriately, and it was only possible to obtain a brittle molded product that was easily torn and that included many sections where melting had not occurred. Consequently, mold staining resistance and low-temperature flexibility could not be evaluated.

Example 8

<Production of Vinyl Chloride Resin Composition>

With the exception of plasticizers (trimellitic acid ester, polyester A, and epoxidized soybean oil) and vinyl chloride resin fine particles used as a dusting agent, the ingredients indicated in Table 2 were loaded into and mixed in a Henschel mixer. The temperature of the mixture was raised to 80° C., at which point, all the plasticizers were added, and drying up of the mixture was caused to occur (i.e., the mixture changed to a dry state through absorption of the plasticizers by vinyl chloride resin particles used as a vinyl chloride resin). Thereafter, once the dried-up mixture had been cooled to 70° C. or lower, the vinyl chloride resin fine particles used as the dusting agent were added to the mixture to produce a vinyl chloride resin composition.

<Formation of Vinyl Chloride Resin Molded Product>

A vinyl chloride resin molded sheet having dimensions of 145 mm×175 mm×1 mm and a vinyl chloride resin molded sheet having dimensions of 200 mm×300 mm×1 mm were produced as described below.

Specifically, the vinyl chloride resin composition obtained as described above was sprinkled onto a textured mold that was heated to a temperature of 250° C. and, after being left to melt for an arbitrary time, excess vinyl chloride resin composition was shaken off. Thereafter, the textured mold onto which the vinyl chloride resin composition had been sprinkled was placed at rest in an oven set to a temperature of 200° C., and once 60 seconds had passed after being placed at rest, the textured mold was cooled with cooling water. Once the mold temperature had dropped to 40° C., a vinyl chloride resin molded sheet was removed from the mold as a vinyl chloride resin molded product.

Pre-heating (initial) low-temperature flexibility was measured and evaluated for an obtained vinyl chloride resin molded sheet (dimensions: 145 mm×175 mm×1 mm) by the previously described method. Moreover, pre-heating (initial) low-temperature tensile elongation was measured and evaluated for an obtained vinyl chloride resin molded sheet (dimensions: 200 mm×300 mm×1 mm) by the previously described method. The results are shown in Table 2.

<Formation of Laminate>

An obtained vinyl chloride resin molded sheet (dimensions: 200 mm×300 mm×1 mm) was placed inside a 200 mm×300 mm×10 mm mold with the textured surface facing downward.

A polyol mixture was separately obtained by mixing 50 parts of a PO (propylene oxide)/EO (ethylene oxide) block adduct of propylene glycol (hydroxyl value: 28; terminal EO unit content: 10%; internal EO unit content: 4%), 50 parts of a PO/EO block adduct of glycerin (hydroxyl value: 21; terminal EO unit content: 14%), 2.5 parts of water, 0.2 parts of an ethylene glycol solution of triethylenediamine (produced by Tosoh Corporation; product name: TEDA-L33), 1.2 parts of triethanolamine, 0.5 parts of triethylamine, and 0.5 parts of a foam stabilizer (produced by Shin-Etsu Chemical Co., Ltd.; product name: F-122). The obtained polyol mixture was mixed with polymethylene polyphenylene polyisocyanate (polymeric MDI) in a ratio determined to give an index of 98 so as to prepare a mixed liquid. The prepared mixed liquid was poured onto the vinyl chloride resin molded sheet that had been placed in the mold as described above. Thereafter, the mold was covered by a 348 mm×255 mm×10 mm aluminum plate to seal the mold. After sealing, the mold was left for 5 minutes so as to form a laminate in which a vinyl chloride resin molded sheet (thickness: 1 mm) as a surface skin was lined with a foamed polyurethane molded product (thickness: 9 mm; density: 0.2 g/cm$^3$).

The formed laminate was removed from the mold, and post-heating (heat aging test) low-temperature tensile elongation was measured and evaluated for the vinyl chloride resin sheet of the laminate by the previously described method. The result is shown in Table 2.

Examples 9 and 10

A vinyl chloride resin composition, a vinyl chloride resin molded product, and a laminate were produced in the same way as in Example 8 with the exception that an amount of bis(2-ethylhexyl) dodecanedioate indicated in Table 2 was further used as a plasticizer. Measurements and evaluations were made in the same manner as in Example 8. The results are shown in Table 2.

TABLE 1

| | | Comparative Example 1 | Example 1 | Example 2 | Example 3 | Comparative Example 2 | Comparative Example 3 | Comparative Example 4 | Example 4 | Example 5 | Example 6 | Example 7 | Comparative Example 5 |
|---|---|---|---|---|---|---|---|---|---|---|---|---|---|
| Formulation | (a) Vinyl chloride resin | Vinyl chloride resin particles[1] [parts by mass] | 100 | 100 | 100 | 100 | 100 | 100 | 100 | 100 | 100 | 100 | 100 | 100 |
| | | Vinyl chloride resin fine particles[2] [parts by mass] | 8 | 8 | 8 | 8 | 8 | 8 | 8 | 8 | 8 | 8 | 8 | 8 |
| | | Vinyl chloride resin fine particles[3] [parts by mass] | 8 | 8 | 8 | 8 | 8 | 8 | 8 | 8 | 8 | 8 | 8 | 8 |
| | Plasticizer | (b) Trimellitic acid ester[4] [parts by mass] | 0 | 20 | 40 | 50 | 60 | 70 | 110 | 18 | 36 | 16 | 15 | 11 |
| | | (c) Polyester A [parts by mass] | 110 | 90 | 70 | 60 | 50 | 40 | 0 | 82 | 64 | 74 | 65 | 49 |
| | | Other plasticizer (epoxidized soybean oil)[5] [parts by mass] | 5 | 5 | 5 | 5 | 5 | 5 | 5 | 5 | 5 | 5 | 5 | 5 |
| | Stabilizer | Perchloric acid-substituted hydrotalcite[6] [parts by mass] | 4.5 | 4.5 | 4.5 | 4.5 | 4.5 | 4.5 | 4.5 | 4.5 | 4.5 | 4.5 | 4.5 | 4.5 |
| | | Zeolite[7] [parts by mass] | 2.4 | 2.4 | 2.4 | 2.4 | 2.4 | 2.4 | 2.4 | 2.4 | 2.4 | 2.4 | 2.4 | 2.4 |
| | | Stearoylbenzoylmethane (β-diketone)[8] [parts by mass] | 0.5 | 0.5 | 0.5 | 0.5 | 0.5 | 0.5 | 0.5 | 0.5 | 0.5 | 0.5 | 0.5 | 0.5 |
| | | Triisodecyl phosphite[9] [parts by mass] | 0.3 | 0.3 | 0.3 | 0.3 | 0.3 | 0.3 | 0.3 | 0.3 | 0.3 | 0.3 | 0.3 | 0.3 |
| | | Hindered amine light stabilizer[10] [parts by mass] | 0.2 | 0.2 | 0.2 | 0.2 | 0.2 | 0.2 | 0.2 | 0.2 | 0.2 | 0.2 | 0.2 | 0.2 |
| | Mold release agent | Zinc stearate[11] [parts by mass] | 0.2 | 0.2 | 0.2 | 0.2 | 0.2 | 0.2 | 0.2 | 0.2 | 0.2 | 0.2 | 0.2 | 0.2 |
| | | 12-Hydroxystearic acid[12] [parts by mass] | 0.4 | 0.4 | 0.4 | 0.4 | 0.4 | 0.4 | 0.4 | 0.4 | 0.4 | 0.4 | 0.4 | 0.4 |
| | Silicone oil | Unmodified silicone oil[13] [parts by mass] | 3.8 | 3.8 | 3.8 | 3.8 | 3.8 | 3.8 | 3.8 | 3.8 | 3.8 | 3.8 | 3.8 | 3.8 |
| | Pigment | Black color[14] [parts by mass] | 3.8 | 3.8 | 3.8 | 3.8 | 3.8 | 3.8 | 3.8 | 3.8 | 3.8 | 3.8 | 3.8 | 3.8 |
| Content per 100 parts by mass of (a) vinyl chloride resin | | (b) Trimellitic acid ester [parts by mass] | 0.0 | 17.2 | 34.5 | 43.1 | 51.7 | 60.3 | 94.8 | 15.5 | 31.0 | 13.8 | 12.9 | 9.5 |
| | | (c) Polyester A [parts by mass] | 94.8 | 77.6 | 60.3 | 51.7 | 43.1 | 34.5 | 0.0 | 70.7 | 55.2 | 63.8 | 56.0 | 42.2 |
| | | Total of (b) trimellitic acid ester and (c) polyester A [parts by mass] | 94.8 | 94.8 | 94.8 | 94.8 | 94.8 | 94.8 | 94.8 | 86.2 | 86.2 | 77.6 | 69.0 | 51.7 |
| Proportion constituted by (c) polyester A in total content of (b) trimellitic acid ester and (c) polyester A [mass %] | | | 100 | 82 | 64 | 55 | 45 | 36 | 0 | 82 | 64 | 82 | 81 | 82 |
| Evaluation | Low-temperature flexibility | Pre-heating (initial) peak top temperature [° C.] | −31 | −33 | −36 | −38 | −40 | −41 | −47 | −29 | −31 | −26 | −22 | — |
| | | Post-heating (1 week at 120° C.) peak top temperature [° C.] | −18 | −15 | −13 | −14 | −8 | −9 | −9 | −7 | −1 | −3 | 2 | — |
| | | Maintenance of low-temperature flexibility: Peak top temperature difference between before and after heating [° C.] | 13 | 17 | 23 | 24 | 32 | 32 | 38 | 22 | 30 | 22 | 24 | — |
| | Melting temperature [° C.] | | 249 | 244 | 243 | 241 | 240 | 240 | 234 | 264 | ≥270 | ≥270 | ≥270 | — |
| | Mold staining resistance | | C | A | A | A | A | A | A | A | A | A | A | — |

TABLE 2

| | | | Example 8 | Example 9 | Example 10 |
|---|---|---|---|---|---|
| Formulation | (a) Vinyl chloride resin | Vinyl chloride resin particles[15] [parts by mass] | 100 | 100 | 100 |
| | | Vinyl chloride resin fine particles (dusting agent)[2] [parts by mass] | 8 | 8 | 8 |
| | | Vinyl chloride resin fine particles (dusting agent)[3] [parts by mass] | 8 | 8 | 8 |
| | (x) Plasticizer | (b) Trimellitic acid ester[4] [parts by mass] | 50 | 40 | 30 |
| | | (c) Polyester A [parts by mass] | 60 | 60 | 60 |
| | | (d) Bis(2-ethylhexyl) dodecanedioate[16] [parts by mass] | — | 10 | 20 |
| | | (e) Other plasticizer (epoxidized soybean oil[5]) [parts by mass] | 5 | 5 | 5 |
| | Stabilizer | Perchloric acid-treated hydrotalcite[6] [parts by mass] | 4.5 | 4.5 | 4.5 |
| | | Zeolite[7] [parts by mass] | 2.4 | 2.4 | 2.4 |
| | | Stearoylbenzoylmethane (β-diketone)[8] [parts by mass] | 0.5 | 0.5 | 0.5 |
| | | Triisodecylphosphite[9] [parts by mass] | 0.3 | 0.3 | 0.3 |
| | | Zinc stearate[11] [parts by mass] | 0.2 | 0.2 | 0.2 |
| | Mold release agent | 12-Hydroxystearic acid[12] [parts by mass] | 0.2 | 0.2 | 0.2 |
| | Pigment | Black color[14] [parts by mass] | 3.8 | 3.8 | 3.8 |
| Proportional content of plasticizers (b) to (e) in plasticizer (x) | | Proportion of (b) trimellitic acid ester [%] | 43.48 | 34.78 | 26.09 |
| | | Proportion of (c) polyester A [%] | 52.17 | 52.17 | 52.17 |
| | | Proportion of (d) bis(2-ethylhexyl) dodecanedioate [%] | 0.00 | 8.70 | 17.39 |
| | | Proportion of (e) other plasticizer [%] | 4.35 | 4.35 | 4.35 |
| Evaluation | Tensile breaking elongation at low temperature (−10° C.) [%] | Pre-heating (initial) | 260 | 270 | 290 |
| | | After 500 hours of heating (120° C.) | 150 | 180 | 190 |
| | Low-temperature flexibility (pre-heating (initial) peak top temperature) [° C.] | | −39 | −43 | −46 |

(1) Product name: ZEST® (ZEST is a registered trademark in Japan, other countries, or both) 1700ZI (produced by suspension polymerization; average degree of polymerization: 1,700; volume-average particle diameter: 129 μm); produced by Shin Dai-ichi Vinyl Corporation (2) Product name: ZEST PQLTX (produced by emulsion polymerization; average degree of polymerization: 800; volume-average particle diameter: 1.8 μm); produced by Shin Dai-ichi Vinyl Corporation (3) Product name: Ryuron paste 761 (produced by emulsion polymerization; average degree of polymerization: 2,100; volume-average particle diameter: 1.7 μm); produced by Tosoh Corporation (4) Product name: TRIMEX N-08; produced by Kao Corporation (5) Product name: ADK CIZER O-130S; produced by ADEKA Corporation (6) Product name: ALCAMIZER® (ALCAMIZER is a registered trademark in Japan, other countries, or both) 5; produced by Kyowa Chemical Industry Co., Ltd.

(7) Product name: MIZUKALIZER DS; produced by Mizusawa Industrial Chemicals, Ltd.

(8) Product name: Karenz DK-1; produced by Showa Denko K. K.

(9) Product name: ADK STAB SC-131; produced by ADEKA Corporation

(10) Product name: LA-72; produced by ADEKA Corporation

(11) Product name: SAKAI SZ2000; produced by Sakai Chemical Industry Co., Ltd.

(12) Product name: ADK STAB LS-12; produced by ADEKA Corporation

(13) Product name: KF-96H-300,000 cs (unmodified silicone oil (polydimethylsiloxane); viscosity: $30 \times 10^4$ cs); produced by Shin-Etsu Silicone

(14) Product name: DA PX 1720(A) Black; produced by Dainichiseika Color and Chemicals Mfg. Co., Ltd.

(15) Product name: ZEST® 1300S (produced by suspension polymerization; average degree of polymerization: 1,300; volume-average particle diameter: 132 μm); produced by Shin Dai-ichi Vinyl Corporation

(16) Produced by Wako Pure Chemical Industries, Ltd.

It can be seen from Table 1 that the vinyl chloride resin compositions of Examples 1 to 7, which are each obtained by using (b) a trimellitic acid ester and (c) a polyester including specific structural units as plasticizers, by setting the total content of the (b) trimellitic acid ester and the (c) polyester as not less than a specific value, and by setting the proportion constituted by the content of the (c) polyester in the aforementioned total content as more than a specific value, each have excellent mold staining resistance and can form a vinyl chloride resin molded product that can maintain low-temperature flexibility well between before and after heating.

In contrast, it can be seen that although the vinyl chloride resin composition of Comparative Example 1, which is obtained using only the (c) polyester as a plasticizer without using the (b) trimellitic acid ester, can form a vinyl chloride resin molded product that can maintain low-temperature flexibility well between before and after heating, the vinyl chloride resin composition of Comparative Example 1 has poor mold staining resistance.

It can also be seen that although mold staining resistance is good for the vinyl chloride resin compositions of Comparative Examples 2 to 4 in which (b) a trimellitic acid ester and (c) a polyester including specific structural units are used and the total content of the (b) trimellitic acid ester and the (c) polyester is not less than the specific value, but in which the proportion constituted by the content of the (c) polyester in the aforementioned total content is not more than the specific value, the vinyl chloride resin compositions of Comparative Examples 2 to 4 cannot form a vinyl chloride resin molded product that can maintain low-temperature flexibility well between before and after heating.

It can also be seen that the vinyl chloride resin composition of Comparative Example 5, which has a total content of the (b) trimellitic acid ester and the (c) polyester that is less than the specific value, does not have sufficient meltability and cannot form a suitable vinyl chloride resin molded product.

Furthermore, it can be seen from Table 2 that vinyl chloride resin molded products formed using the vinyl chloride resin compositions of Examples 9 and 10, which are each obtained using a plasticizer that includes (b) a trimellitic acid ester, (c) a polyester including specific structural units, (d) a dodecanedioic acid diester, and (e) a plasticizer other than (b) to (d) in specific proportions, have excellent low-temperature tensile elongation after heating compared to a vinyl chloride resin molded product formed using the vinyl chloride resin composition of Example 8, which is obtained using a plasticizer that does not include (d) a dodecanedioic acid diester.

INDUSTRIAL APPLICABILITY

According to the present disclosure, it is possible to provide a vinyl chloride resin composition that has excellent mold staining resistance and that can form a vinyl chloride resin molded product that can maintain low-temperature flexibility well between before and after heating.

Moreover, according to the present disclosure, it is possible to provide a vinyl chloride resin molded product that can maintain low-temperature flexibility well between before and after heating.

Furthermore, according to the present disclosure, it is possible to provide a laminate including the aforementioned vinyl chloride resin molded product.

The invention claimed is:

1. A vinyl chloride resin composition comprising: (a) a vinyl chloride resin; and (x) a plasticizer, wherein
the (x) plasticizer includes:
(b) a tri-n-alkyl trimellitate; and
(c) a polyester including a structural unit derived from adipic acid and a structural unit derived from 3-methyl-1,5-pentanediol,
total content of the (b) tri-n-alkyl trimellitate and the (c) polyester is 90 parts by mass or more and 140 parts by mass or less per 100 parts by mass of the (a) vinyl chloride resin,
a proportion constituted by content of the (c) polyester in the total content of the (b) tri-n-alkyl trimellitate and the (c) polyester is more than 50 mass %, and
the (a) vinyl chloride resin includes vinyl chloride resin particles having a volume-average particle diameter of not less than 30 μm and not more than 500 μm and vinyl chloride resin fine particles having a volume-average particle diameter of less than 30 μm.

2. The vinyl chloride resin composition according to claim 1, wherein a vinyl chloride resin forming the vinyl chloride resin particles has an average degree of polymerization of 5,000 or less.

3. The vinyl chloride resin composition according to claim 1, wherein a vinyl chloride resin forming the vinyl chloride resin fine particles has an average degree of polymerization of 2,600 or less.

4. The vinyl chloride resin composition according to claim 1, wherein
the (x) plasticizer includes:
not less than 7 mass % and less than 49.5 mass % of the (b) tri-n-alkyl trimellitate;
more than 37.5 mass % and not more than 75 mass % of the (c) polyester;
not less than 1 mass % and not more than 20 mass % of (d) a dodecanedioic acid diester; and
not less than 0 mass % and not more than 5 mass % of (e) a plasticizer other than (b), (c), and (d).

5. The vinyl chloride resin composition according to claim 4, comprising not less than 66 parts by mass and not more than 200 parts by mass, in total, of the (b) tri-n-alkyl trimellitate, the (c) polyester, and the (d) dodecanedioic acid diester per 100 parts by mass of the (a) vinyl chloride resin.

6. The vinyl chloride resin composition according to claim 4, wherein a mass ratio (c/d) of the (c) polyester and the (d) dodecanedioic acid diester is not less than 3/2 and not more than 10/1.

7. The vinyl chloride resin composition according to claim 1 used in powder molding.

8. The vinyl chloride resin composition according to claim 1 used in powder slush molding.

9. A vinyl chloride resin molded product obtained through molding of the vinyl chloride resin composition according to claim 1.

10. The vinyl chloride resin molded product according to claim 9 for an automobile instrument panel surface skin.

11. A laminate comprising: a foamed polyurethane molded product; and the vinyl chloride resin molded product according to claim 9.

12. The laminate according to claim 11 for an automobile instrument panel.

13. The vinyl chloride resin composition according to claim 1 further comprising: epoxidized soy bean oil; and a stabilizer.

* * * * *